Dec. 6, 1955
E. J. SLATTERY
2,726,103
COLLAPSIBLE HOSE COUPLING
Filed Aug. 29, 1951
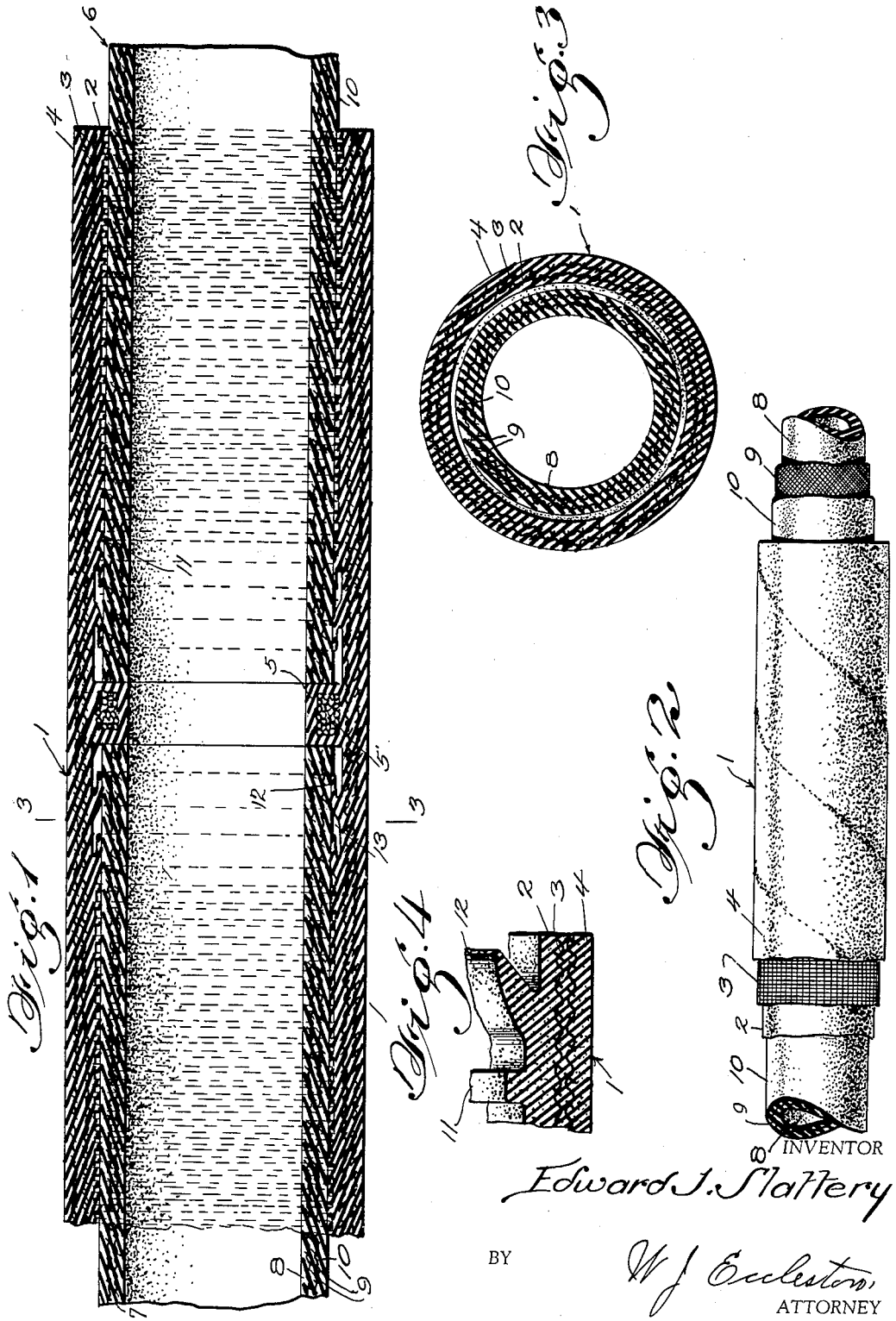
INVENTOR
Edward J. Slattery
BY
W. J. Eccleston,
ATTORNEY

United States Patent Office 2,726,103
Patented Dec. 6, 1955

2,726,103
COLLAPSIBLE HOSE COUPLING

Edward J. Slattery, Washington, D. C.

Application August 29, 1951, Serial No. 244,249

4 Claims. (Cl. 285—71)

(Granted under Title 35, U. S. Code (1952), sec. 266)

The invention described herein, if patented, may be manufactured and used by or for the Government for governmental purposes, without the payment to me of any royalty thereon.

This application is a continuation-in-part of my application Serial No. 162,772, filed May 18, 1950, for Collapsible Hose Coupling.

This invention relates to hose couplings and has for its primary object to provide a simplified and inexpensive structure whereby the two ends of adjacent hose sections may be readily connected in an expeditious manner without the use of tools and without any modification of the ends of the hose sections.

A further object of the invention consists in the provision of a simplified hose coupling which is so constructed that the pressure of the fluid passing through the hose provides the force necessary to seal the coupling against leakage and also prevent detachment of the hose sections from the coupling member.

Another object of the invention resides in the provision of a hose coupling formed of rubber, rubberized fabric, or the like, which includes no metal parts and which therefore may be collapsed when wound upon a reel.

Another object of the invention consists in providing a coupling in which the coupling sleeve is made of a rubber and woven fabric ply construction and the fabric ply is straight-laid to render the sleeve substantially non-expansible and in which the hose is also of a rubber and woven fabric ply construction and the fabric ply is bias-laid to render the hose more expansible than the sleeve, whereby pressure in the hose will expand the hose so that it will fit tightly against the interior wall of the substantially non-expansible coupling sleeve.

Other objects and advantages of the invention will be apparent from the following description taken in connection with the accompanying drawings in which, Figure 1 is a longitudinal sectional view through the novel hose coupling with adjacent hose sections mounted therein;

Figure 2 is a side elevational view, parts being broken away, of the structure shown in Figure 1; and Figure 3 is a cross sectional view taken on line 3—3 of Figure 1; and Figure 4 is a detail view of one of the sealing lips.

It sometimes happens in the use of flexible hose that due to wear and tear, frequent bending, or excessive pressure, leaks will be formed in the hose. Also, in the use of hose in the military service, in addition to the deteriorating effects just mentioned, the hose, or parts thereof, may be destroyed by enemy fire or the like. The present invention therefore is intended primarily to provide a coupling for flexible hose such as may be used on the ground for conveying water, liquid fuel, etc. It is essential, of course, that the hose be promptly repaired, and that the repair be made without the use of tools, and yet the coupling be sufficiently tight to prevent leakage of fuel or the like.

The coupling sleeve 1 is of a rubber and fabric construction, comprising an inner layer of rubber 2, an immediate layer of woven fabric 3, and an outer layer of rubber 4. The fabric 3 is straight-laid, that is, the warp threads of the fabric extend parallel of the axis of the sleeve and the weft threads lie in a plane that is perpendicular to the axis of the sleeve. This construction renders the sleeve or coupling substantially non-expansive. It will be obvious, of course, that one or more plies of the fabric may be employed depending on the service for which the coupling is intended to be used.

Midway of the length of the bore of coupling 1 there is provided a circumferential rib 5 projecting inwardly a substantial distance from the interior wall of the coupling. This rib 5 serves as a stop to limit the extent of insertion of the hose sections 6 and 7 as will appear hereinafter, and the rib may be reinforced by the threads 5' as indicated in Figure 1.

Hose sections 6 and 7 have an outer diameter substantially equal to the inner diameter of the sleeve or coupling 1 and are made of the usual rubber and ply construction including an inner layer of rubber 8, an intermediate layer of fabric 9 and an outer layer of rubber 10. In this instance, however, the fabric is bias-laid so that the threads of fabric are positioned at an angle to the axis of the hose section. This construction thus allows the hose sections to expand more readily under pressure than does the sleeve or coupling 1, so that when the hose sections are inserted in the coupling they will expand to fit tightly against the interior thereof, particularly when pressure fluid is passing through the sections.

In order to enhance the sealing action between the hose sections and the coupling sleeve 1, the interior wall of the sleeve is provided with a plurality of circumferential ribs 11. When internal pressure is exerted on the hose sections 6 and 7, the sections will expand and are tightly gripped by the ribs 11 to provide a tight seal. Furthermore, the ribs 11 serve to resist any tendency of the hose sections to be forced or withdrawn from the coupling sleeve 1.

Additional circumferential ribs 12 are also provided in the sleeve for the purpose of perfecting the sealing action. As will be noted from an inspection of the drawings these ribs 12 are substantially larger than the ribs 11 and are inclined toward the center of the sleeve. These annular ribs 12 present very little resistance to the insertion of the hose sections into the coupling 10 but present considerably greater resistance to the withdrawal of the hose sections therefrom. As can be seen in Figure 1 of the drawings, the hose sections bend the ribs 12 forwardly, that is, toward the center of the coupling, when they are inserted therein. In this bent over position the ribs 12 provide pockets or chambers 13. Therefore, when pressure is applied to the hose section, any leakage between the ends of the sections and the stop rib 5 will pass into the spaces or chambers 13. The pressure in these spaces acts on the bent over ribs 12 to more tightly press them against the outer wall of the hose sections and to thereby increase their effective sealing action and to increase their effectiveness in withstanding withdrawal of the hose sections from the coupling.

While the structural features of the novel hose coupling have been described in considerable detail, it is to be understood that the present disclosure is intended as illustrative of the invention rather than in a limiting sense, and that the invention is broad enough to include various modifications within the scope of the appended claims.

I claim:

1. A hose coupling, comprising in combination a cylindrical coupling sleeve, said sleeve being of a soft rubber and fabric ply construction, the fabric ply being straight-laid, a pair of cylindrical hose sections, each hose section having an outer diameter approximately equal to the inner diameter of the sleeve whereby they may be inserted in the ends of the sleeve, said pair of hose sections being of a soft rubber and fabric ply construction, the fabric ply being bias-laid, and stop means within the coupling sleeve to limit the extent of insertion of the hose sections therein.

2. A hose coupling, comprising in combination a cylindrical coupling sleeve, said sleeve being of a soft rubber and fabric ply construction, the fabric ply being straight-laid, a pair of cylindrical hose sections, each hose section having an outer diameter approximately equal to the inner diameter of the sleeve whereby they may be inserted in the ends of the sleeve, said pair of hose sections being of a soft rubber and fabric ply construction, the fabric ply being bias-laid, and means within the coupling sleeve to increase the sealing action between the sleeve and the hose sections inserted therein and for resisting the withdrawal of the hose sections from the sleeves.

3. A hose coupling, comprising in combination a cylindrical coupling sleeve, said sleeve being of a soft rubber and fabric ply construction, the fabric ply being straight-laid, a pair of cylindrical hose sections, each hose section having an outer diameter approximately equal to the inner diameter of the sleeve whereby they may be inserted in the ends of the sleeve, said pair of hose sections being of a soft rubber and fabric ply construction, the fabric ply being bias-laid and circumferential sealing ribs within the coupling sleeve.

4. A hose coupling, comprising in combination a cylindrical coupling sleeve, said sleeve being of a soft rubber and fabric ply construction, the fabric ply being straight-laid, a pair of cylindrical hose sections, each hose section having an outer diameter approximately equal to the inner diameter of the sleeve whereby they may be inserted in the ends of the sleeve, said pair of hose sections being of a soft rubber and fabric ply construction, the fabric ply being bias-laid and circumferential ribs within the coupling sleeve to increase the sealing action between the sleeve and the hose sections inserted therein, some of said circumferential ribs being larger than others and having one side thereof tapered and the other side undercut.

References Cited in the file of this patent

UNITED STATES PATENTS

| | | |
|---|---|---|
| 706,466 | Stowe | Aug. 5, 1902 |
| 1,926,197 | Durr | Sept. 12, 1933 |
| 2,329,490 | Smith | Sept. 14, 1943 |
| 2,329,836 | Huthsing | Sept. 21, 1943 |
| 2,507,536 | Goodson | May 16, 1950 |
| 2,547,983 | Slattery | Apr. 10, 1951 |